United States Patent
Chotai et al.

(10) Patent No.: US 7,730,411 B2
(45) Date of Patent: Jun. 1, 2010

(54) RE-CREATING MEETING CONTEXT

(75) Inventors: Ashish Chotai, Santa Clara, CA (US); Sravan Vadlakonda, Sunnyvale, CA (US); Shantanu Sarkar, San Jose, CA (US); Aseem Asthana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 11/701,567

(22) Filed: Feb. 1, 2007

(65) Prior Publication Data

US 2008/0189624 A1    Aug. 7, 2008

(51) Int. Cl.
*G06F 3/00* (2006.01)
(52) U.S. Cl. ............... 715/753; 715/751; 715/704
(58) Field of Classification Search .......... 715/753, 715/704, 751, 971
See application file for complete search history.

(56) References Cited

U.S. PATENT DOCUMENTS

| | | | |
|---|---|---|---|
| 5,842,009 A | 11/1998 | Borovoy et al. | |
| 6,119,147 A * | 9/2000 | Toomey et al. | 709/204 |
| 7,213,051 B2 * | 5/2007 | Zhu et al. | 709/205 |
| 7,379,848 B2 * | 5/2008 | Yu et al. | 702/186 |
| 2002/0161804 A1 | 10/2002 | Chiu et al. | |
| 2005/0172035 A1 | 8/2005 | Morris | |
| 2006/0224722 A1 | 10/2006 | McGowan et al. | |
| 2006/0284981 A1 * | 12/2006 | Erol et al. | 348/207.1 |
| 2007/0022159 A1 * | 1/2007 | Zhu et al. | 709/204 |
| 2008/0008458 A1 * | 1/2008 | Gudipaty et al. | 386/131 |
| 2009/0113312 A1 * | 4/2009 | Schoenberg | 715/753 |

* cited by examiner

*Primary Examiner*—Dennis Bonshock
(74) *Attorney, Agent, or Firm*—Michael C. Stephens, Jr.; Trellis IP Law Group, PC

(57) ABSTRACT

In one embodiment, a method can include: (i) connecting to a conference server via a network; (ii) viewing a list of available past meetings and associated forms of access; (iii) selecting a meeting and form of access from the list; and (iv) re-creating the meeting in a context using the form of access. Example forms of access can include a dialing of all meeting participants, re-creating a previous meeting context, summarizing a meeting, displaying action items, and replaying or viewing a portion of a meeting.

20 Claims, 5 Drawing Sheets

RE-CREATING MEETING CONTEXT

TECHNICAL FIELD

The present disclosure relates generally to conferencing systems and approaches.

BACKGROUND

Recurring or periodic meetings are common in most corporate environments. Examples of recurring meetings are weekly project status meetings, operations reviews, and ongoing customer interactions. Typical characteristics of such meetings can include: taking down minutes of meetings, assigning action items before the next meeting, and resuming discussions that were previously interrupted because of an ended meeting.

Thus, a lot of time may be spent in managing recurring or other meeting tasks that may be related to a previous meeting. Typically, when participants join a meeting, a lot of time may be spent in recalling and/or resuming discussions that were interrupted or not completed in a previous meeting. As a result, e-mails may need to be generated to provide summaries, to remind people of pending tasks, or otherwise to extend such meeting management. Conventionally, recurring or continuing meetings can be set up in some e-mail programs or other applications, but this approach is insufficient for many aspects of managing typical corporate meetings.

DESCRIPTION OF EXAMPLE EMBODIMENTS

Overview

Figure 1:
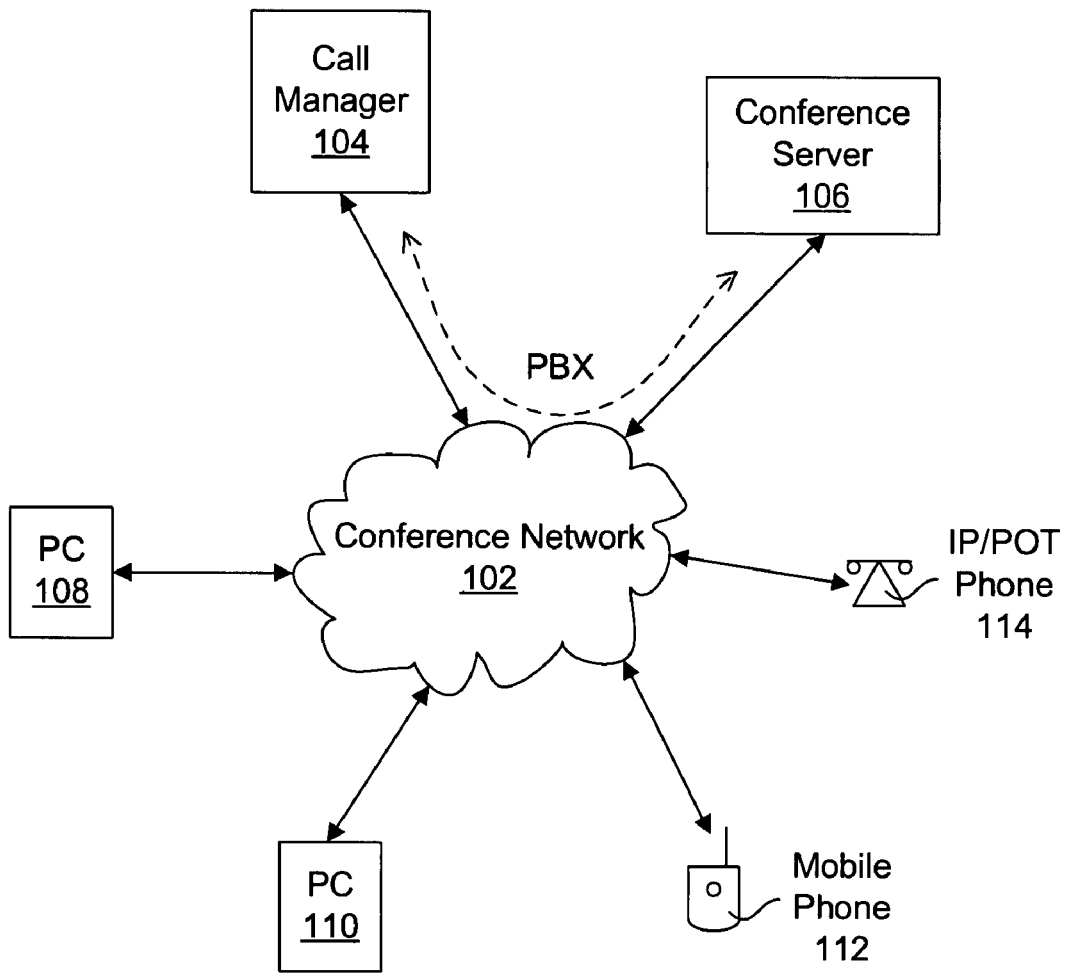
FIG. 1 illustrates an example conference system.

In one embodiment, a method can include: (i) connecting to a conference server via a network; (ii) viewing a list of available past meetings and associated forms of access; (iii) selecting a meeting and form of access from the list; and (iv) re-creating the meeting in a context using the form of access. Example forms of access can include a dialing of all meeting participants, re-creating a previous meeting context, summarizing a meeting, displaying action items, and replaying or viewing a portion of a meeting.

In one embodiment, an apparatus can include a controller configured to: (i) show meeting content via a display screen, the meeting content having at least one of a plurality of modalities; (ii) display a list of available past meetings and associated forms of access on the display screen; (iii) receive selection of a meeting and form of access via a user interface; and (iv) re-create the meeting in a context using the form of access.

In one embodiment, a system can include: (i) a conference server coupled to a network; and (ii) a plurality of endpoints coupled to the network, where the conference server is configured to: (a) provide meeting content via a content interface in at least one of the plurality of endpoints, the meeting content having at least one of a plurality of modalities; (b) provide a list of available past meetings and associated forms of access on the content interface; (c) receive selection of a meeting and form of access via a user interface coupled to the content interface; and (d) re-create the meeting in a context using the form of access.

Example Embodiments

In particular embodiments, a previous meeting context can be automatically generated and made available to all participants when they join a meeting. Such context can be chosen using a form of access when selecting a previous meeting, or a default previous meeting context can simply be "resumed." The context that can be re-created may be in the form of a voice conversation, text/instant messenger (IM) conversations, sidebar conversations, summary display, action item display, and the like. Thus, a user can select for re-creation a different context than in a selected previous meeting, or the same context can automatically be provided when no such context selection is made. A user's "form of access" can be used for specifying the previous meeting context in which the user wishes to proceed.

Generally, context can include more essential elements that meeting participants may wish to see, such as a place in a shared document or IM conversation where a previous meeting stopped, and information (e.g., meeting summary context) that a user might want to see in order to catch up with what happened in a previous meeting. This approach can be beneficial for recurring or periodic meetings, for example. Context can essentially be anything related to the content of a meeting, including notes on a white board, things meeting participants said, documents shown in the meeting. Further, content can be provided in any modality, such as video, audio, text, and/or web, for example.

Referring now to FIG. 1, an example conference system is shown and indicated by the general reference character 100. Endpoints can include a "soft" phone running on a PC (e.g., 108, 110), for example. Also, all modalities can be as in a previous meeting. System 100 can include call manager 104 and conference server 106 coupled to conference network 102. Conference network 102 can be a private network, such as a virtual private network (VPN), or a public network (e.g., the Internet). Also, endpoints can include Internet protocol (IP)/plain old telephone (POT) phone 114, as well as mobile phone 112, which can interface with conference network 102. In particular embodiments, a software patch can be loaded onto conference server 106 to facilitate context re-creation as described herein.

Depending on the particular kind of meeting shown by a user, call manager 104 may also be equipped to participate in particular embodiments. In such cases, call manager 104 and conference server 106 can form a private branch exchange (PBX), for example. Further, call manager 104 and conference server 106 may be integrated in a single device or structure. Conference server 106 can support text-based (e.g., IM), telephone, video, or any other modality type meetings. Call manager 104 can also include call detail records (CDR) for tracking meeting participants and other statistics.

Figure 2:
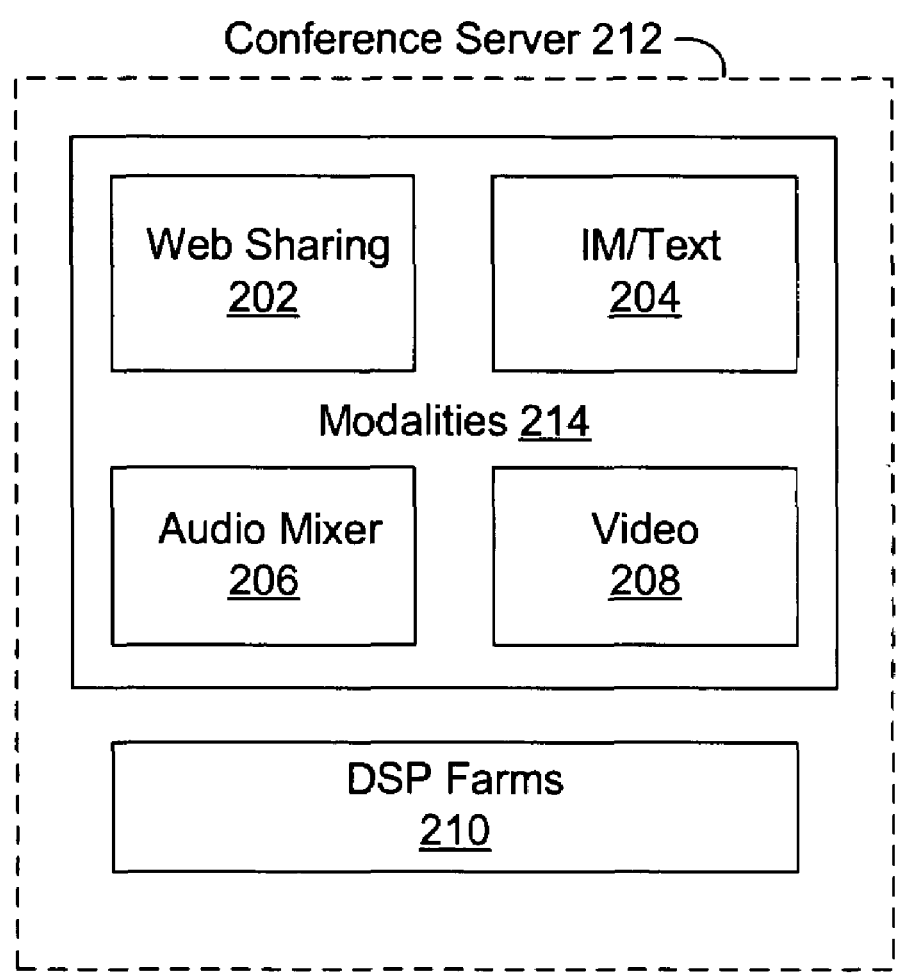
FIG. 2 illustrates example conference server components.

Referring now to FIG. 2, example conference server components are shown and indicated by the general reference character 200. Multiple modalities 214 can be supported in conference server 212. Modalities 214 can include web sharing 202, IM/text 204, audio mixer 206, and video 208. Further, conference server 212 can include digital signal processor (DSP) farms 210, such as may be found in routers or servers anywhere in a particular network, for example.

Figure 3:
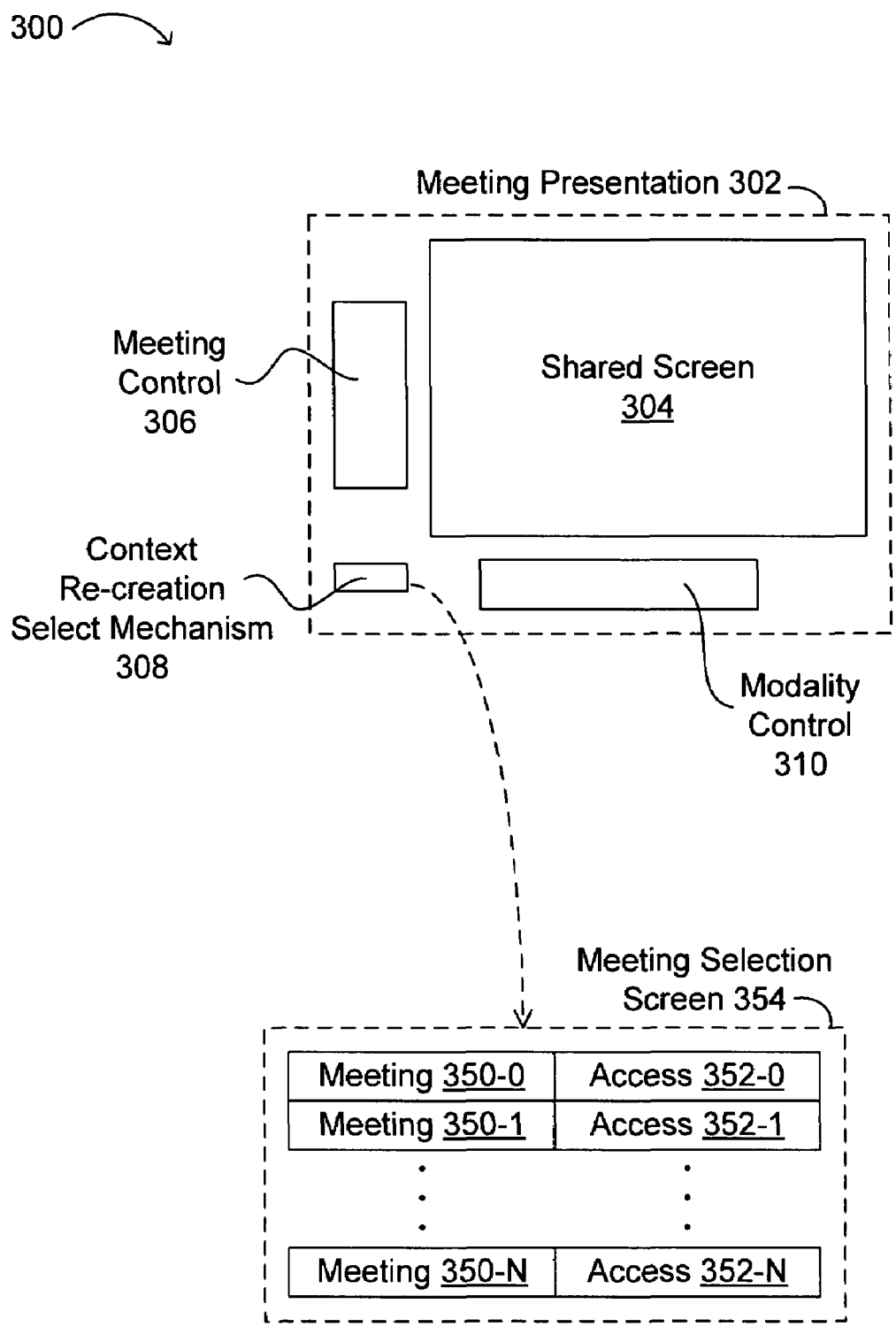
FIG. 3 illustrates an example context re-creation user interface.

Referring now to FIG. 3, an example context re-creation user interface is shown and indicated by the general reference character 300. Meeting presentation 302 can include shared screen 304, meeting control 306, context re-creation select mechanism 308, and modality control 310. In some embodiments, shared screen 304 can be an interface other than a display screen (e.g., including a speaker for an audio-only meeting, or using any other suitable content interface). If a user selects context re-creation select mechanism 308, meeting selection screen 354 can be displayed. Meeting selection screen 354 can show past meetings, as well as associated forms of access for choosing context. For example, past meetings can include meetings 350-0, 350-1, . . . 350-N, with associated forms of access 352-0, 352-1, . . . 352-N.

In particular embodiments, such a user interface can facilitate a participant accessing content, as will be discussed in more detail herein. In addition, often times ad hoc meetings and/or conversations may evolve into serious discussions that may then be converted into a recurring event or meeting for future accessing. For such a case, a button or other control can be included for converting to a scheduled conference for subsequent meetings, for example.

In addition, most collaboration software available today can allow for documents to be "attached" to meetings. When these documents are discussed or are being reviewed, often times the documents are stopped at a particular page, to be resumed from this point in the next meeting. In particular embodiments, re-creating context can include where shared documents are archived and automatically opened at the same page where loaded during the previous meeting. This can be accomplished in particular embodiments by remembering navigation "tags" in the shared documents.

In particular embodiments, summary, meeting minutes, and action items can also be appended to any (e.g., a recurring) meeting. Such context may be useful for all meeting participants, or other people affected by meeting activities. Since a large portion of time may be spent in recalling where participants left off in a discussion in a previous or last meeting, a summary button/control can be utilized to detail a summary of the previous discussion. Such a summary can be created by having a meeting moderator press a summary button to leave a text summary, or the moderator may record the summary as a voice message. The summary button can also be opened to all meeting participants for the inclusion of individual summary items. Further, the same summary button can be clicked by the participants to read and/or listen to the summary in the next meeting.

For example, at the end or in the middle of a conference, Bob holds a button down and says, "so, next time we will discuss if at all we should use SIP as our signaling protocol," then Bob releases the button. Then, Alice holds down the button and says "well, let's discuss the staffing issue in the next meeting" and she releases to button. These example statements can represent cues for discussion for a future meeting, and such cues may be included in the meeting summary. Other examples of context in particular embodiments include personal notes and annotations. For example, participants can add notes to themselves, such as "remind me to ask Bob about what he meant by such and such."

Another type of context can include an ability to catch-up to contents of a previous meeting. In particular embodiments, a catch-up button can be included where the recording of a portion of a selected previous meeting is made available to all participants. For example, the last 10 minutes of the last meeting may be made available to participants in the current meeting via such a catch-up function. In this fashion, the participants can dial into the conference a few minutes early and catch-up on the discussions that took place in the last meeting.

In particular embodiments, re-creation of IM/text conversations from previous meetings can also be accommodated. IM content and/or logs can be placed in the meeting area for relatively easy access by meeting participants using a button, or other appropriate control. All private "sidebar" conversations can also be viewable by individual participants in those conversations. Such sidebar conversations can include mini-conferences that go on in the background or back-drop of a main conference. Further, sidebar modalities can be primarily voice, but may also include IM, as well as video, for example. In particular embodiments, sidebar conversations can be re-created when the relevant participants in a sidebar dial-in to a recurring meeting. Further, particular embodiments can include a restarting of an IM session interrupted when a previous meeting ended, also including private sidebar sessions, for example.

Figure 4:
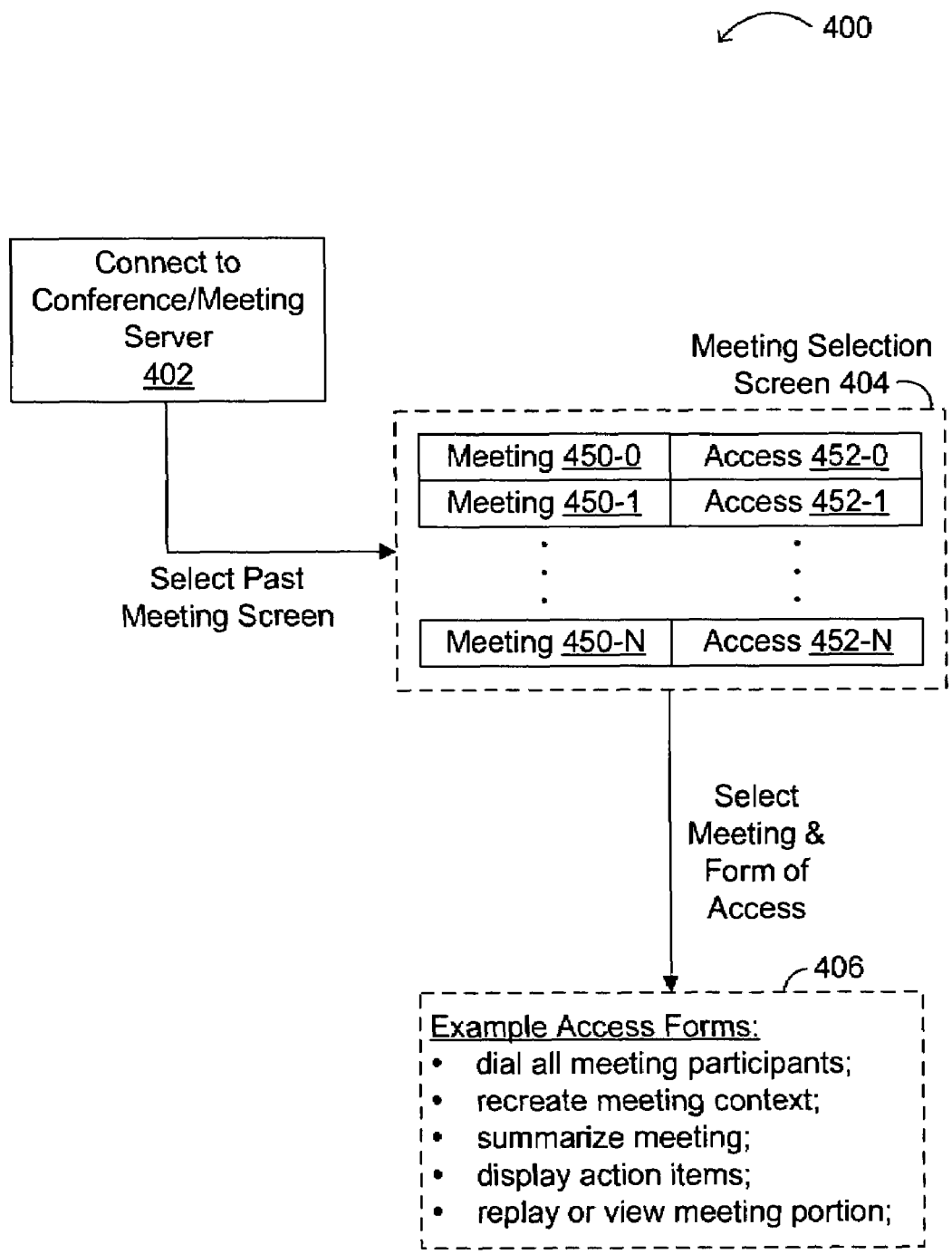
FIG. 4 illustrates an example context re-creation process.

Referring now to FIG. 4, an example context re-creation process is shown and indicated by the general reference character 400. A user can connect to a conference/meeting server (402), and a past meetings screen can be selected (e.g., meeting selection screen 404). Meeting selection screen 404 can include meetings 450-0, 450-1, . . . 450-N, with associated forms of access 452-0, 452-1, . . . 452-N. Once a user selects a meeting and a form of access via meeting selection screen 404, the meeting can be re-created in a context using the form of access. Example access forms 406 can include dialing all meeting participants, re-creating a previous meeting context, summarizing a meeting, displaying action items, and replaying or viewing a meeting portion, just to name a few.

Connecting to conference/meeting server (402) can be done via a phone and via a web-based device, or by simply using an IP phone. If using a regular phone, the phone can dial-in to a conference server, while web-based access can include logging-in to the conference server. In particular embodiments, re-creating meeting context can include essentially returning the meeting participants to the selected previous meeting in whatever context was used in that meeting (e.g., IM, video, etc.), or a different context can be chosen by way of a form of access selection.

Figure 5:
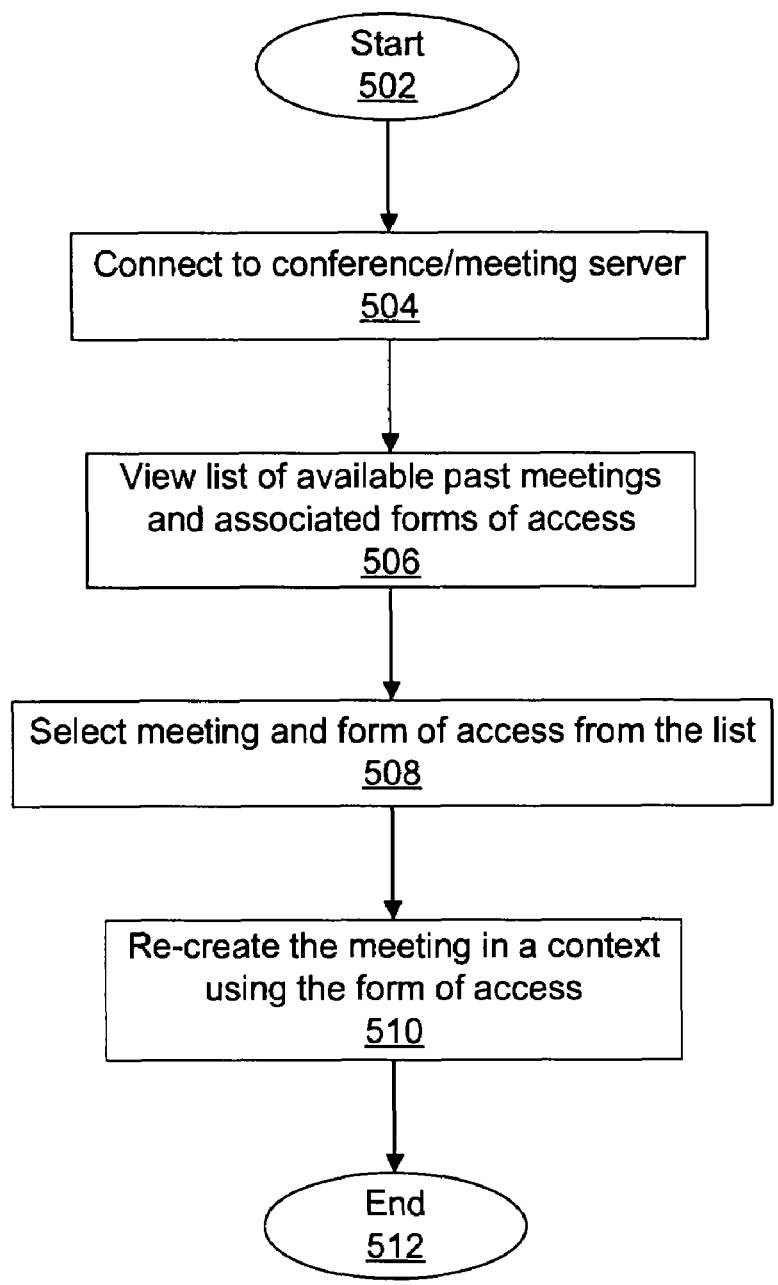
FIG. 5 illustrates an example flow of a context re-creation.

Referring now to FIG. 5, an example flow of a context re-creation is shown and indicated by the general reference character 500. The flow can begin (502), and a connection can be made to a conference/meeting server (504). A list of available past meetings and associated forms of access can be displayed (506). Next, one of the meetings and an associated form of access can be selected from the list (508). The meeting can then be re-created in a context using the form of access (510), and the flow can complete (512).

Although the description has been described with respect to particular embodiments thereof, these particular embodiments are merely illustrative, and not restrictive. For example, while specific conference system arrangements and approaches have been described, other types of conferencing or communicating can be included in particular embodiments. Also, other types of context and/or forms of access, as well as supported modalities, can be included in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising a controller configured to:
provide meeting content via a display screen, the meeting content having at least one of a plurality of modalities for conveying the meeting content to a user;
provide for the display of a meeting selection screen on the display screen, a list of available past meetings displayed with their associated forms of access for each of the available past meetings, wherein the displayed forms of access for each of the available past meetings comprise an original form of access context and at least one context that is different from the original form of access context used in a corresponding available past meeting, the at least one different context being at least one of: a voice conversation, text/instant messenger conversations, and sidebar conversations;

receive selection of a past meeting and a form of access from the displayed list of available past meetings and forms of access via a user interface coupled to the display screen, wherein the selected form of access specifies a context of the selected past meeting in which a user wishes to participate in a new meeting; and re-create in the new meeting, the selected past meeting in the specified context using the selected form of access to allow a plurality of participants in the new meeting to resume the selected past meeting to begin the new meeting, wherein the plurality of participants includes the user.

2. The apparatus of claim 1, wherein the controller comprises a conference server.

3. The apparatus of claim 2, further comprising a call manager coupled to the conference server.

4. The apparatus of claim 1, wherein the selected form of access comprises a summary of the selected past meeting.

5. The apparatus of claim 1, wherein the selected form of access comprises a replay of a portion of the selected past meeting.

6. The apparatus of claim 1, wherein the controller is configured to store the new meeting as an available past meeting upon completion of the new meeting.

7. The apparatus of claim 1, wherein the selected form of access comprises a display of action items from the selected past meeting.

8. The apparatus of claim 1, wherein the selected form of access comprises a dialing of all participants of the selected past meeting.

9. A method, comprising:

receiving a request for connection to a conference server via a network;

provide for the display of a meeting selection screen on the display screen, a list of available past meetings displayed with their associated forms of access for each of the available past meetings, wherein the displayed forms of access for each of the available past meetings comprise an original form of access context and at least one context that is different from the original form of access context used in a corresponding available past meeting, the at least one different context being at least one of: a voice conversation, text/instant messenger conversations, and sidebar conversations;

receive selection of a past meeting and a form of access from the displayed list of available past meetings and forms of access via a user interface coupled to the display screen, wherein the selected form of access specifies a context of the selected past meeting in which a user wishes to participate in a new meeting; and re-create in the new meeting, the selected past meeting in the specified context using the selected form of access to allow a plurality of participants in the new meeting to resume the selected past meeting to begin the new meeting, wherein the plurality of participants includes the user.

10. The method of claim 9, wherein the list of available past meetings is provided by a call manager coupled to the conference server.

11. The method of claim 9, wherein the selected past meeting comprises a conference, the conference having a plurality of modalities.

12. The method of claim 9, wherein the selected form of access comprises a summary of the selected past meeting.

13. The method of claim 9, wherein the selected form of access comprises a replay of a portion of the selected past meeting.

14. The method of claim 9, further comprising storing the new meeting as an available past meeting upon completion of the new meeting.

15. The method of claim 9, wherein the selected form of access comprises a display of action items from the selected meeting.

16. The method of claim 9, wherein the context includes a sidebar conversation.

17. A system, comprising:

a conference server coupled to a network; and a plurality of endpoints coupled to the network, wherein the conference server is configured to:

provide meeting content via a content interface in at least one of the plurality of endpoints, the meeting content having at least one of a plurality of modalities for conveying the meeting content to a user;

provide for the display of a meeting selection screen on the content interface, a list of available past meetings displayed with their associated forms of access for each of the available past meetings, wherein the displayed forms of access for each of the available past meetings comprise an original form of access context and at least one context that is different from the original form of access context used in a corresponding available past meeting, the at least one different context being at least one of: a voice conversation, text/instant messenger conversations, and sidebar conversations;

receive selection of a past meeting and a form of access from the list of available past meetings and forms of access via a user interface coupled to the content interface, wherein the selected form of access specifies a context of the selected past meeting in which a user wishes to participate in a new meeting; and re-create in the new meeting, the selected past meeting in the specified context using the selected form of access to allow a plurality of participants in the new meeting to resume the selected past meeting to begin the new meeting, wherein the plurality of participants includes the user.

18. The system of claim 17, further comprising a call manager coupled to the conference server.

19. The system of claim 17, wherein the plurality of endpoints comprises an Internet protocol (IP) phone.

20. The system of claim 17, wherein the selected form of access comprises at least one of: a summary of the meeting, a replay of a portion of the meeting, a continuation of the meeting in a same context, a display of action items from the meeting, and a dialing of all participants of the meeting.

* * * * *